Jan. 13, 1925.                                                          1,522,964
J. W. MEADOWCROFT
ELECTRODE CLAMPING DEVICE FOR ELECTRIC WELDING MACHINES
Filed Aug. 16, 1921

Witness
Walter M. Trout

INVENTOR.
Joseph W. Meadowcroft
BY
C. B. Des Jardins
ATTORNEY.

Patented Jan. 13, 1925.

1,522,964

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRODE-CLAMPING DEVICE FOR ELECTRIC-WELDING MACHINES.

Application filed August 16, 1921. Serial No. 492,695.

*To all whom it may concern:*

Be it known that I, JOSEPH W. MEADOWCROFT, a citizen of the United States, residing at Philadelphia, Pennsylvania, have invented certain new and useful Improvements in Electrode-Clamping Devices for Electric-Welding Machines, of which I declare the following to be a full, clear, and exact description.

My invention relates to an improved device for releasably locking or clamping the electrodes used in electric welding machines. It relates particularly to a device for clamping the electrode in position relative to the stationary arm of an electric spot-welding machine.

The stationary arm of an electric spot-welder is usually made of copper so as to furnish a path for the welding current of relatively low resistivity. Heretofore, it has been the practice to insert the electrode through a transverse opening in this arm and to clamp the electrode in place in such opening by a set screw. This has proven objectionable because the workman, in adjusting the electrode to compensate for wear, very often pounds on the end of the arm to start the electrode from its seat. This is very destructive of the soft copper arm and shortens its life very materially.

The objects of my invention is to provide a device for locking or clamping the electrode in an electric welding machine of such a nature that the supporting arm will be adequately protected from blows in adjusting the electrode and the objections noted above will be eliminated.

Another object of my invention is to provide a clamping device for the electrode which shall be quickly and easily releasable, to permit adjustment or removal of the electrode, and which provides an adequate electrical contact between the electrode and the supporting arm.

Further objects, and objects relating to details and economies of construction and operation, will definitely appear from the detailed description to follow. My invention is clearly defined and pointed out in the appended claims. It will be obvious that a curved surface affords a maximum of contact surface for a rod or bearing and thus much more surface than could be provided if a flat end surface were used instead of the curved surface. A structure, constituting a preferred embodiment of my invention, is illustrated in the accompanying drawings, forming a part of this specification, in which:—

Figure 1:
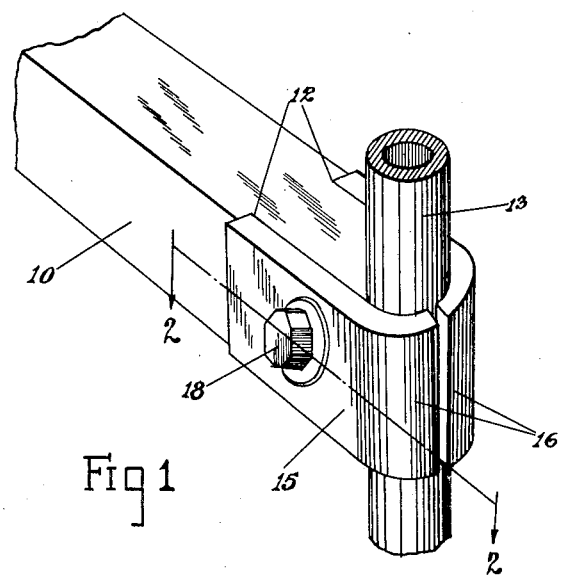
Figure 2:
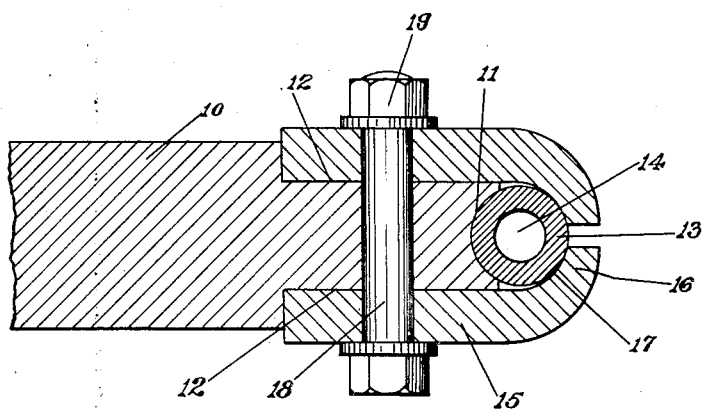

Fig. 1 is a perspective view showing the end of the stationary supporting arm of an electric welding machine and an electrode clamped thereto by means of my invention, and Fig. 2 is a sectional view through the end of the arm, taken on the line 2—2 of Fig. 1, looking in the direction of the arrows.

In the drawings, similar reference numerals refer to similar parts throughout the several views.

In general, my invention consists in providing a transverse seat in the end of the stationary supporting arm, in which the electrode seats, the seat being of such a character as to give ample surface contact between the supporting arm and the electrode. The electrode is rigidly and firmly fastened in said seat by one or more clamping plates having fingers overhanging the electrode and so arranged as to have a wedging action on the electrode, to clamp it in its seat as the clamping plate is drawn toward the stationary supporting arm.

The structure illustrated in the accompanying drawings constitutes one embodiment of my invention and comprises the stationary supporting arm, 10, having a half-round, transverse seat, 11, formed in the end thereof to receive the electrode, 13. As is customary and usual in electric welding machines, the stationary supporting arm, 10, and the stationary electrode, 13, are both of copper so that the welding current has a path of low resistance through the arm and the electrode to the weld. In order to keep the resistance low, it is also desirable that the area of surface contact between the arm, 10, and the electrode, 13, be large and, therefore, I provide the half-round seat, 11, in which the electrode is clamped. The electrode may be provided with a central passage, 14, through which water flows to cool the electrode.

In order to clamp the electrode rigidly in place, and yet in a manner permitting quick release for removal or adjustment, I provide the steel clamping plates, 15, which fit in the seats, 12, formed in the sides of the stationary arm, 10. These clamping plates have curved ends forming the fingers, 16, which overhang and extend part way around and so embrace the electrode, 13. The inner faces, 17, of these fingers engage the electrode and have such a shape or curvature that, as the clamping plates are drawn toward the sides of the arm, 10, these faces, 17, exert a cam or wedging action on the electrode, 13, clamping it firmly and rigidly in the seat, 11. The plates, 15, are drawn toward the sides of the arm, 10, and clamped in the seats, 12, by the bolt, 18, extending through the plates, 15, and the arm 10, and co-acting with the nut, 19, threaded on the end of the bolt.

It will be observed that, when the clamping plates, 15, are drawn to position, the fingers, 16, exert a powerful cam or wedge action on the electrode, 13, which is effective to hold the electrode rigidly in its adjusted position in the seat, 11. Furthermore, the end of the soft copper arm, 10, is entirely protected by the clamping plates, 15, and these steel plates will not be affected materially by any pounding or hammering on them incidental to the removal or adjustment of the electrode. This adds materially to the life of the welding machine. It is also to be noted that this clamping device may be operated very readily and easily to release the electrode and this facilitates the removal or adjustment of the electrode.

I am aware that the embodiment shown here may be changed considerably without departing from the spirit of my invention and, therefore, I claim my invention broadly, as indicated by the appended claims.

Having thus described my invention, what I claim as new and desire to secure by Letters Patent is:—

1. An electrode clamping device for electric welding machines comprising, in combination with an arm of the welding machine having an electrode seat at its end to receive an electrode clamping means detachably secured to said arm and having a portion overhanging the end of said arm and engaging said electrode to force the same rigidly into its seat.

2. An electrode clamping device for electric welding machines comprising, in combination with an arm of the welding machine having an electrode seat at one end thereof to receive an electrode positioned in said seat, a clamping plate secured to the side of said arm and having a portion overhanging the end of said arm and engaging said electrode, and means for clamping said plate to the arm to force said electrode rigidly into said seat.

3. An electrode clamping device for electric welding machines comprising, in combination with an arm of the welding machine having an electrode seat at one end thereof to receive an electrode, a clamping plate secured to the side of said arm and having a curved finger overhanging the end of said arm and said electrode and provided with a wedge surface engaging said electrode, and means for clamping said plate to the arm to wedge said electrode rigidly into said seat.

4. An electrode clamping device for electric welding machines comprising, in combination with an arm of the welding machine having a transverse, concave electrode seat at one end thereof to receive an electrode, a clamping plate secured to the side of said arm and having a portion overhanging the end of said arm and said electrode and provided with a wedge surface engaging said electrode, and a bolt for releasably clamping said plate to said arm to wedge said electrode rigidly into the concave seat.

5. An electrode clamping device for electric welding machines comprising, in combination with an arm of the welding machine having an electrode seat at one end thereof to receive an electrode, clamping plates secured to opposite sides of said arm and provided with portions overhanging and engaging said electrode, and means for clamping said plates to said arm to force the electrode rigidly into said seat.

6. An electrode clamping device for electric welding machines comprising, in combination with an arm of the welding machine having a transverse, concave electrode seat at one end thereof to receive an electrode, a pair of clamping plates engaging opposite sides of said arm and having portions overhanging said electrode and provided with wedge surfaces engaging the electrode, and means for releasably clamping the plates to said arm to wedge the electrode into said concave seat.

7. An electrode clamping device for electric welding machines comprising, in combination with an arm of the welding machine having a transverse electrode seat at one end thereof, portions of the sides of said arm being cut away to form a reduced end portion and shoulders spaced from the end of said arm, a pair of clamping members detachably secured to opposite sides of said arm in engagement with said shoulders and having portions overhanging the electrode to force it to the seat in the end of said arm.

8. An electrode clamping device for electric welding machines, comprising in combination with an arm of the welding machine having an electrode seat to receive an electrode, L-shaped clamping means detachably secured to said arm and having one branch partially overhanging the electrode, and means co-operating with the other branch to exert pressure through the first-named branch, whereby to wedge the electrode rigidly into its seat.

In testimony whereof, I affix my signature.

JOSEPH W. MEADOWCROFT.